(12) United States Patent
Siddeley et al.

(10) Patent No.: US 9,807,562 B2
(45) Date of Patent: *Oct. 31, 2017

(54) METHOD AND SYSTEM FOR OBTAINING LOCATION INFORMATION REGARDING A DEVICE IN A WIRELESS NETWORK

(71) Applicant: BCE INC., Verdun (CA)

(72) Inventors: Edward Siddeley, Toronto (CA); Francis Fernandes, Mississauga (CA)

(73) Assignee: BCE INC., Verdun (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,876

(22) Filed: May 2, 2016

(65) Prior Publication Data

US 2016/0286356 A1   Sep. 29, 2016

Related U.S. Application Data

(63) Continuation of application No. 13/517,408, filed as application No. PCT/CA2010/002076 on Dec. 21, 2010, now Pat. No. 9,332,379.

(Continued)

(51) Int. Cl.
*H04W 4/02* (2009.01)
*H04L 29/08* (2006.01)
(Continued)

(52) U.S. Cl.
CPC ............ *H04W 4/025* (2013.01); *H04L 67/18* (2013.01); *H04W 4/02* (2013.01); *H04W 4/22* (2013.01); *H04W 8/08* (2013.01); *H04W 64/00* (2013.01)

(58) Field of Classification Search
CPC ...... H04L 67/18; H04L 65/1006; H04W 4/02; H04W 4/22; H04W 64/00; H04W 76/007;
(Continued)

(56) References Cited

U.S. PATENT DOCUMENTS

| 6,757,545 | B2 * | 6/2004 | Nowak ................... | H04W 4/22 342/357.29 |
| 7,200,380 | B2 * | 4/2007 | Havlark ................ | H04W 64/00 455/404.2 |

(Continued)

*Primary Examiner* — Matthew Sams
(74) *Attorney, Agent, or Firm* — Gowling WLG (Canada) LLP

(57) ABSTRACT

A method for execution by at least one entity in a wireless communication environment, comprising: receiving a request for location information pertaining to a subscriber device; obtaining contextual information regarding the request; and formulating a positioning request for transmission to the device, wherein depending on the contextual information, the positioning request is formulated to instruct the device to retrieve location information from a first or a second type of location establishment entity. Also, a method for execution by at least one entity in a wireless communication environment, the method comprising: receiving a request for location information pertaining to a device; determining that the device is equipped with both a built-in location establishment entity and a removable location establishment entity; consulting an information database to select one of the location establishment entities; instructing the device to retrieve location information from the selected location establishment entity.

16 Claims, 8 Drawing Sheets

Related U.S. Application Data

(60) Provisional application No. 61/288,681, filed on Dec. 21, 2009.

(51) Int. Cl.
*H04W 4/22* (2009.01)
*H04W 8/08* (2009.01)
*H04W 64/00* (2009.01)

(58) Field of Classification Search
CPC ............ G01S 5/0263; H04M 2242/04; H04M 2242/14; H04M 2242/30
See application file for complete search history.

(56) References Cited

U.S. PATENT DOCUMENTS

| | | | | |
|---|---|---|---|---|
| 7,613,155 B2* | 11/2009 | Shim | ................... | H04L 63/0272 370/338 |
| 8,208,948 B2* | 6/2012 | Kim | ........................ | H04W 8/10 455/456.2 |
| 8,463,298 B2* | 6/2013 | Kim | ........................ | H04W 8/10 455/456.2 |
| 8,706,134 B2* | 4/2014 | Wasserman | ............ | G01C 21/20 340/988 |
| 9,332,379 B2* | 5/2016 | Siddeley | .................. | H04W 4/02 |
| 2003/0027554 A1* | 2/2003 | Haumont | .............. | H04M 15/08 455/414.1 |
| 2005/0255857 A1* | 11/2005 | Kim | ........................ | H04W 8/10 455/456.1 |
| 2005/0255866 A1* | 11/2005 | Dupuy | .................. | G01S 5/0263 455/456.6 |
| 2006/0099958 A1* | 5/2006 | Gustafsson | ............ | H04W 8/10 455/456.1 |
| 2007/0060097 A1* | 3/2007 | Edge | ................. | H04L 29/06027 455/404.1 |
| 2007/0287473 A1* | 12/2007 | Dupray | .................. | H04W 4/02 455/456.1 |
| 2012/0252493 A1* | 10/2012 | Siddeley | ................. | H04W 4/02 455/456.2 |

* cited by examiner

| LBS application | Combination of parameter values ||||||| Path taken through FIG. 9 |
|---|---|---|---|---|---|---|---|
| | Subscriber | Mobile network | Device | SIM/UIC card | Business Params. | |
| ROW 1:<br>Type=E911<br>Trusted=Y<br>Timeout=30s | Visitor;<br>advanced<br>SIM card | Active sub.<br>w/o data session | 3G=Y<br>GPS=Y<br>BIP=Y | AGPS=Y | prepaid<br>Lang=eng | 232, 234B,<br>236BC |
| ROW 2:<br>Type=E911<br>Trusted=Y<br>Timeout=30s | Home network user;<br>standard SIM card | Active sub.<br>w/o data session | 3G=Y<br>GPS=Y<br>BIP=u/k | AGPS=N | prepaid<br>Lang=eng | 232, 234B,<br>236BC |
| ROW 3:<br>Type=hosted<br>Trusted=Y<br>Timeout=60s | Home network user;<br>standard SIM card | Active sub.<br>w/o data session | 3G=Y<br>GPS=Y<br>BIP=N | AGPS=N | prepaid<br>Lang=eng | 232, 234B,<br>236BU,<br>240BU,<br>238BU |
| ROW 4:<br>Type=hosted<br>Trusted=Y<br>Timeout=60s | Visitor;<br>advanced<br>SIM card | Active sub.<br>w/o data session | 3G=Y<br>GPS=u/k<br>BIP=u/k | AGPS=Y | prepaid<br>Lang=eng | 232, 234R,<br>238R, 236R |
| ROW 5:<br>Type=3rd pty<br>Trusted=N<br>Timeout=90s | Home network user;<br>advanced SIM card | Active sub. w/ active data session | 3G=Y<br>GPS=Y<br>BIP=Y | AGPS=Y | postpaid<br>Lang=eng | 232, 234R,<br>236R |
| ROWS 6+<br>... | | | | | | ... |

FIG. 8

METHOD AND SYSTEM FOR OBTAINING LOCATION INFORMATION REGARDING A DEVICE IN A WIRELESS NETWORK

CROSS-REFERENCE TO RELATED APPLICATIONS

The current application is a Continuation of U.S. patent application Ser. No. 13/517,408, filed Jun. 20, 2012, which is a National Phase entry of International Application No. PCT/CA2010/002076, filed Dec. 21, 2010, which claims priority to U.S. Provisional Patent Application Ser. No. 61/288,681, all of which are incorporated by reference herein in their entirety.

TECHNICAL FIELD

The present invention relates generally to wireless communications and, in particular, to a method and system for obtaining location information regarding a device in a wireless network.

BACKGROUND

When a Location-Based Services (LBS) application wishes to establish the location of a mobile station (MS) in a wireless network, the application may send a location request message to the wireless carrier that serves the MS. In response, the carrier may engage in a process to determine where the MS is currently located, and the carrier may then generate a response to the location request and send the response to the LBS application. To this end, the wireless carrier may operate a location server that acts as a front end for receiving location requests from the LBS application and forwarding those requests to a position determining system. Thus, when the location server receives a location request from the LBS application, the location server may send a corresponding location request to the position determining system, and the position determining system may, in turn, determine the location of the MS. The positioning system returns the determined location of the MS to the location server, which then returns to the LBS application the determined location or data derived from the determined location (such as mapping, routing, or street address information, for instance).

Oftentimes to determine the location of a MS, the position determining system will need to obtain location information from the MS itself. Depending on the capabilities of the MS, the location information that can be obtained from the MS may comprise satellite positioning data, such as global positioning system (GPS) readings or other data, information regarding the cell/sector in which the MS is currently operating, and information about signals the MS is receiving from various base stations, for instance. However, not all MSs are equipped with the same capabilities for generating location information. Moreover, some MSs are equipped with multiple modules capable of supplying location information but having different response and precision characteristics. Thus, it will be appreciated that methods previously used for communicating with a MS in order to obtain location information can be inadequate.

SUMMARY OF THE INVENTION

According to a first broad aspect, the present invention seeks to provide a method for execution by at least one entity in a wireless communication environment, the method comprising: receiving a request for location information pertaining to a subscriber device; obtaining contextual information regarding the request for location information; and formulating a positioning request for transmission to the device, wherein depending on the contextual information, the positioning request is formulated to instruct the device to retrieve location information from a first type of location establishment entity or from a second type of location establishment entity.

In an embodiment, the first type of location establishment entity is a location establishment entity that is built into the device and the second type of location establishment entity is a location establishment entity that is removable with respect to the device.

In an embodiment, the method further comprises determining a target signaling plane over which to send the location request message to the device. In an embodiment, the target signaling plane is selected from a user plane and a control plane.

In an embodiment, when (i) the positioning request is formulated to instruct the device to retrieve location information from the first type of location entity and (ii) the target signaling plane is selected to be the user plane: the positioning request is sent over a secure user plane connection established with a client agent instantiated by a processing entity that is built into the device.

In an embodiment, when (i) the positioning request is formulated to instruct the device to retrieve location information from the second type of location entity and (ii) the target signaling plane is selected to be the user plane: the positioning request is sent over a secure user plane connection established with a client agent instantiated by a processing entity that is removable with respect to the device.

According to a second broad aspect, the present invention seeks to provide a computer-readable storage medium comprising computer-readable instructions stored thereon, the computer-readable instructions being executable by at least one tangible entity in a wireless communication environment to carry out a method, the method comprising: receiving a request for location information pertaining to a subscriber device; obtaining contextual information regarding the request for location information; and formulating a positioning request for transmission to the device, wherein depending on the contextual information, the positioning request is formulated to instruct the device to retrieve location information from a first type of location establishment entity or from a second type of location establishment entity.

According to a third broad aspect, the present invention seeks to provide an entity in a wireless communication environment, comprising: a processing entity for: receiving a request for location information pertaining to a subscriber device; obtaining contextual information regarding the request for location information; formulating a positioning request for transmission to the device, wherein depending on the contextual information, the positioning request is formulated to instruct the device to retrieve location information from a first type of location establishment entity or from a second type of location establishment entity; and an output for releasing the positioning request towards the device.

According to a fourth broad aspect, the present invention seeks to provide a method for execution by at least one entity in a wireless communication environment, the method comprising: receiving a request for location information pertaining to a subscriber device; determining that the subscriber device is equipped with both a built-in location establishment entity and a removable location establishment entity;

consulting an information database to select a location establishment entity from the built-in location establishment entity and the removable location establishment entity; and instructing the device to retrieve location information from the selected location establishment entity.

BRIEF DESCRIPTION OF THE DRAWINGS

FIG. 8 is a non-limiting example table showing the effect of contextual information on the manner in which a positioning request is delivered to the device.

DETAILED DESCRIPTION

Figure 1:
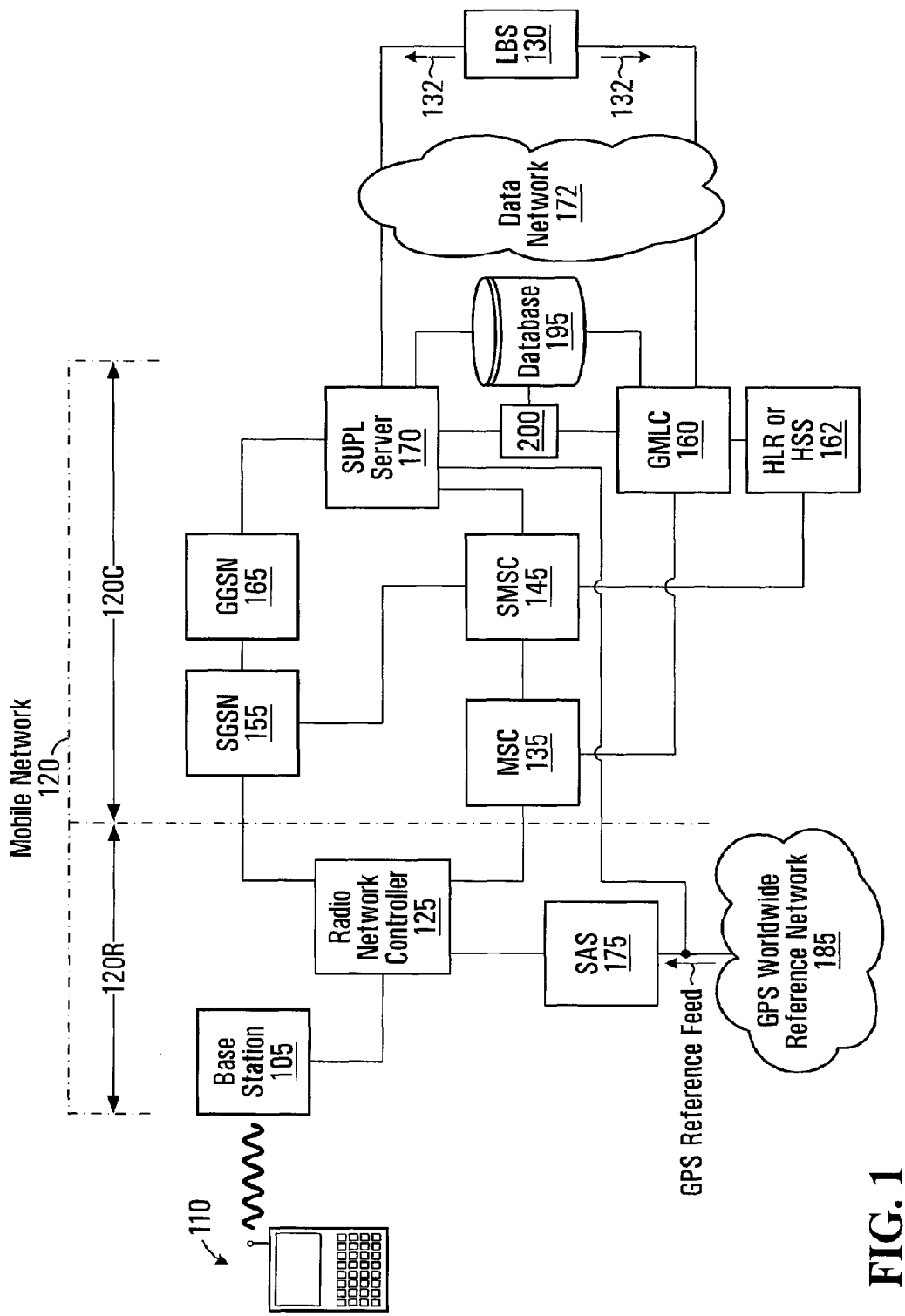
FIG. 1 is a block diagram of a wireless communication environment enabling the use of a particular embodiment of the present invention.

FIG. 1 shows an architecture for obtaining location information pertaining to a device 110 in a wireless communications environment, in accordance with a specific non-limiting embodiment of the present invention. Device 110 can be a wireless device such as a mobile phone, smart phone, BlackBerry™, iPhone™, iPad™, WiFi™-enabled laptop, etc. Device 110 can be associated with a subscription from a wireless carrier, thus the device 100 can be referred to as a subscriber device.

Figure 6:
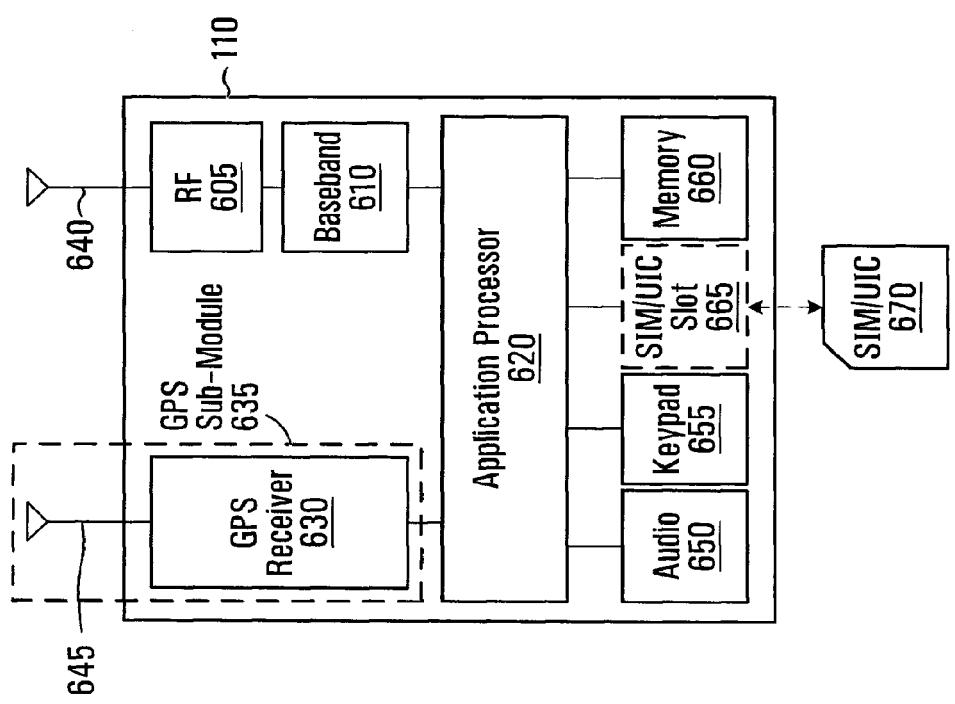
FIG. 6 is a block diagram of a device for use in the wireless communication environment of FIG. 1, including a removable SIM/UIC card and a built-in location establishment entity.

Device 110 may have an example configuration shown in more detail in FIG. 6. Specifically, device 110 may comprise a radio frequency (RF) antenna 640, RF transceiver circuitry 605, baseband modulation/demodulation circuitry 610, a processing entity (in this case referred to as an application processor 620) and a memory 660. An audio device 650 and a keypad 655 can provide input/output functionality as can a variety of other devices known to those of skill in the art. The application processor 620 executes functionality that can be encoded in hardware (by virtue of a specific arrangement of circuitry in the application processor 620) or software (by virtue of machine-readable instructions stored in the memory 660). The memory 660 can also store data for use by the application processor 620 during execution of its program. Other ways of implementing the functionality of the application processor 620 and the memory 660 without departing from the spirit of the invention will be apparent to those of skill in the art.

Device 110 may also comprise a subscriber identity module (SIM) or universal integrated circuit (UIC) card slot 665, hereinafter referred to as a SIM/UIC card slot 665, for receiving a SIM/UIC card 670. The SIM/UIC slot 665 provides one or more connections to the application processor 620 so as to allow communication between the application processor 620 and the SIM/UIC card 670 when the latter is inserted into the SIM/UIC slot 665. For example, a communications bus can be provided for enabling communications between the application processor 620 and the SIM/UIC card 670. Such communications can be carried out in accordance with a communications protocol.

The SIM/UIC card 670 may store information that characterizes device 110, such as a MEID (Mobile Equipment Identifier), IMSI (International Mobile Subscriber Identifier), ICCID (Integrated Circuit Card Identifier), etc., as well as possibly information that characterizes the subscription, as well as possibly various user-entered information (such as a contact list, task list, password vault, etc.). The SIM/UIC card 670 can be removable with respect to device 110.

In order to furnish its location to a requesting entity in the wireless communication environment, device 110 can be equipped with a built-in location establishment entity and/or a removable location establishment entity.

A built-in location establishment entity is part of the internal circuitry of device 110 and is not intended to be removed throughout the useful life of device 110. With continued reference to FIG. 6, a non-limiting example of a built-in location establishment entity is a global positioning system (GPS) sub-module 635, which includes an antenna 645 and a GPS receiver 630. In some embodiments, a separate GPS antenna is not required, and the GPS receiver 630 in GPS sub-module 635 may share the antenna 640 with the RF transceiver circuitry 605. The GPS receiver 630 is configured to demodulate and process signals from various earth-orbiting satellites, as received by the antenna 645 (or 640, as the case may be), in order to derive information characterizing the current location of device 110. The application processor 620 controls operation of the GPS receiver 630 based on parameters received from a requesting entity in the wireless communications environment, and relays the information obtained from the GPS receiver 630 to such requesting entity.

A removable location establishment entity includes location establishment circuitry that can be connected to and disconnected from the internal circuitry of device 110 by a user of device 110. This does not necessarily mean that the location establishment circuitry must be an isolated component, but rather that it be a relatively simple maneuver to disconnect the location establishment circuitry from the internal circuitry of device 110, possibly by disconnecting another component that houses the location establishment entity.

Figure 7:
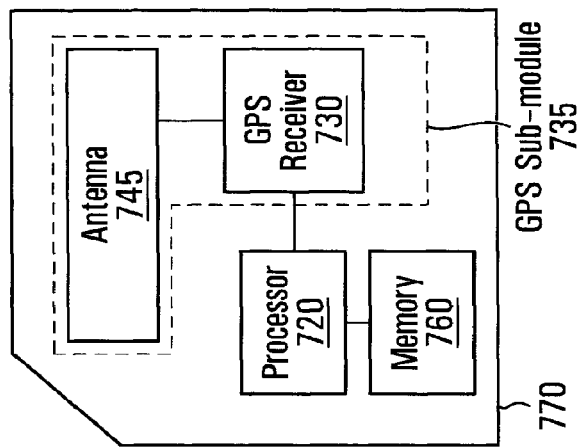
FIG. 7 is a block diagram of a removable SIM/UIC card equipped with a location establishment entity.

For example, FIG. 7 shows a non-limiting example of a removable location establishment entity, implemented as a GPS sub-module 735 of a GPS-equipped SIM/UIC card 770, which can be inserted into the SIM/UIC card slot 665. The GPS-equipped SIM/UIC card 770 includes a processing entity (in this case referred to as a processor 720) and a memory 760. The processor 720 executes functionality that can be encoded in hardware (by virtue of a specific arrangement of circuitry in the processor 720) or software (by virtue of machine-readable instructions stored in the memory 760). The memory 760 can also store data for use by the processor 720 during execution of its program. Other ways of implementing the functionality of the processor 720 and the memory 760 without departing from the spirit of the invention will be apparent to those of skill in the art.

The GPS-equipped SIM/UIC card 770 additionally includes an antenna 745 and a GPS receiver 730 forming part of GPS sub-module 735. The GPS receiver 730 is configured to demodulate and process signals from various earth-orbiting satellites, as received by the antenna 745, in order to derive information characterizing the location of the GPS-equipped SIM/UIC card 770 and therefore of device 110 itself (when the GPS-equipped SIM/UIC card 770 is installed in device 110). The processor 720 controls operation of the GPS receiver 730 based on parameters received from a requesting entity in the wireless communications environment via device 110, and relays the information obtained from the GPS receiver 730 to such requesting entity.

In some embodiments, the GPS-equipped SIM/UIC card 770 may incorporate some of the principles taught in United States Patent Application Publication No. 2009/0088181 to Savolainen, hereby incorporated by reference herein.

In a non-limiting embodiment, the application processor 620 may communicate with the processor 720 (while the GPS-equipped SIM/UIC card 770 is inserted in the slot 665). This can be useful where the application processor 620 desires to obtain the location information from GPS sub-module 735. Communications between the application processor 620 and the processor 720 can take place in accordance with a communications protocol such as the Bearer Independent Protocol (BIP), namely as described in ETSI TS 102 223: "Smart Cards; Card Application Toolkit (CAT) (Release 7)" and related standards. Other protocols may also be used.

As contrasted with the built-in GPS sub-module 635, the removable GPS sub-module 735 may allow new flexibility to be added to devices and users for their net benefit, for example, by adding high accuracy location capabilities post retail to a device not otherwise capable of such a function. This can be achieved through simple insertion of an aftermarket GPS-equipped SIM/UIC card 770 into the conventional slot 665.

In other example, new kinds of hosted location solutions and services can be enabled, which work independently of device 110 regardless of its own pre-existing location capabilities. In a specific non-limiting example, visitors to a country could acquire a GPS-equipped SIM/UIC card 770 that is tailored to a tourism theme, with information and notification features such as city guide and landmark information, advertising and couponing for hospitality services or indeed emergency location information, without affecting overall general purpose performance of device 110.

With specific reference to emergency location information, consider the case where device 110 is an older/cheaper model that does not have built-in location establishment capabilities, or whose built-in location establishment capabilities are only moderately precise. Such a scenario may arise when device 110 is brought in by a visitor arriving from a foreign country and who wishes to connect to the mobile network 120. Under such circumstances, the operator of the mobile network 120 may not be able to provide accurate location services to the (visiting) user of device 110, which threatens the delivery of emergency services. By inserting the aftermarket GPS-equipped SIM/UIC card 770 into the slot 665, device 110 acquires accurate location establishment capabilities, which could allow the operator of the mobile network 120 to meet certain obligations with respect to the delivery of emergency services to all devices, including older/cheaper models and roaming (visiting) devices.

Through operation of the application processor 620, device 110 participates in wireless communications with other components of the wireless communication environment. These components may abide by a standard, such as 3GPP, 802.16, 802.16e and/or 802.16m, to name a few non-limiting possibilities. In the following, certain terms may be more reflective of 3GPP, however this is not to be considered as a limitation or restriction of the present invention. For example, the present invention may also be applicable in a WiMax (IEEE 802.11m) environment.

Referring back to FIG. 1, device 110 communicates with a mobile network 120 that includes a radio access network 120R and a core network 120C.

The radio access network 120R includes various nodes such as a plurality of radio network controllers and base stations, among which is shown is a radio network controller (RNC) 125 connected to a base station 105. The base station 105 irradiates a wireless coverage area such as a cell or cell/sector in which device 110 can communicate with the base station 105 over an air interface. The base station 105 is communicatively coupled to (or integrated with) the radio network controller 125. The radio network controller 125 controls aspects of the air interface (such as channel assignments and handoff). The radio network controller 125 is communicatively coupled to a mobile switching center (MSC) 135 in the core network 120C.

A location assistance function is implemented by the radio access controller 125 or by a Stand-Alone Service Mobile Location Centre (SAS) 175 as shown in FIG. 1. The SAS 175 obtains a GPS reference feed from a GPS worldwide reference network 185. The GPS reference feed includes up-to-date satellite timing reference and almanac information regarding a multitude of GPS satellites orbiting Earth. The SAS 175 receives queries from the radio network controller 125 for satellite data relating to particular devices. For example, the SAS 175 can receive the identity of device 110 (e.g., its IMSI) and, based on this, identifies the base station or cell site that was most recently in communication with device 110. The SAS 175 then consults the GPS reference feed to identify the satellites within line of sight of device 110 and, in particular, may obtain information such as "in the next few moments, satellite A should be in 'xyz' position in the sky, satellite B should be in 'hij' position in the sky, etc."). This use of a location assistance function significantly shortens the time required to calculate a high accuracy location. Other types of information can be provided as part of the GPS reference feed and processed by the location assistance function.

The core network 120C includes an arrangement of switches, gateways and other nodes, including the aforementioned MSC 135, as well as a short message service center (SMSC) 145, a serving GPRS (General Packet Radio Service) support node (SGSN) 155, a gateway GPRS support node (GGSN) 165, a Gateway Mobile Location Center (GMLC) 160 and a Secure User Plane Location (SUPL) server 170. One or more gateways (not shown) may be provided that connect the mobile network 120 to an external data network such as the Internet 172.

The SMSC 145 employs store and forward technology, and any SMS message initiated from device 110 is forwarded to the SMSC 145 which then interrogates the mobile network 120 for the location of the recipient and forwards the content of the SMS message to the recipient. In the reverse direction, SMS messages destined for device 110 are forwarded by the SMSC 145 either along a voice path (via the MSC 135) or along a data path (via the SGSN 155). The SMSC 145 may request routing information from an HLR (Home Location Register) or HSS (Home Subscriber Server) 162.

The MSC 135 provides the signaling and control function for processing mobile voice calls and also SMS messages. The MSC 135 forms a part of the overall wireless communications infrastructure that maintains calls between a fixed or mobile entity to a mobile user within its serving area.

The SGSN 155 provides much the same function as the MSC 135 except that it is used for data sessions and also SMS messages. The SGSN 155 serially connects to the GGSN 165, which is the packet (IP) gateway that anchors a mobile data session between the mobile user and the IP world.

The SUPL server 170 implements a function for creating a secure IP tunnel between a client agent (a "SUPL client") instantiated on device 110 and a server agent instantiated on the SUPL server 170. One of the functions of such secure IP tunnel can be to provide the SUPL server 170 with location information collected from device 110. In certain embodiments, this location information may require up-to-date satellite timing reference and almanac information regarding the multitude of GPS satellites orbiting Earth, and thus the SUPL server may be connected to the GPS worldwide reference network 185 in order to obtain the GPS reference feed discussed earlier.

The GMLC 160 implements functionality required to support location services, and its functionality may be distributed over more than one physical component. The GMLC 160 may request routing information from the HLR or HSS 162.

The components in the mobile network 120 can be used to communicate with device 110 over a "control plane" and a "user plane". Basically, control plane signaling allows for the establishment and monitoring of a user plane connection.

Specifically, in control plane signaling, the GMLC 160 identifies the MSC 135 serving device 110 and will exchange control signals with the MSC 135, and the MSC 135 will in turn engage in exchanging control signals with device 110. The control signals can be instruction set queries/responses. Control plane signaling can be used to retrieve location information from device 110 when it is equipped with a built-in location establishment entity (such as GPS sub-module 635).

Control plane signaling can also be used to establish a connection over the user plane (i.e., a "user plane connection") between device 110 and an entity (a server, another mobile device, etc) via the SGSN 155 and the GGSN 165.

In particular, the user plane connection can comprise a path that allows the transfer of speech, data, etc. between device 110 and the relevant entity. Where the relevant entity is the SUPL server 170, one example of a user plane connection is the aforementioned secure IP tunnel between a client agent (a "SUPL client") instantiated on device 110 and a corresponding server agent instantiated on the SUPL server 170. This secure IP tunnel can then be used to retrieve location information from device 110 when it is equipped with either a built-in location establishment entity (such as GPS sub-module 635) or a removable location establishment entity (such as GPS sub-module 735).

In addition, a Location-Based Services (LBS) node 130 is communicatively coupled to the core network 120C and, more specifically, to the GMLC 160 and/or the SUPL server 170. In a non-limiting embodiment, the LBS node 130 may be connected to the GMLC 160 and/or the SUPL server 170 via a data network 172 such as the Internet. The LBS node 130 can be a trusted entity (e.g., a public safety answering point—PSAP—connected via a secure link) or an untrusted entity (e.g., a server operated by a third party and connected over the Internet). Other degrees of trustworthiness are also possible.

The LBS node 130 executes an LBS application that may desire/require the location of a device associated with a subscriber, such as device 110. Examples of LBS applications that may be offered include City-Walk-And-Map-Guide; Here-I-Am-Instant-Coupons; Show-My-Family-On-A-Map; Emergency 911 with Location; Points-Of-Interest-Drive-By-Ads; Map-My-Friends-Near-Me; Where-Is-My-Missing-Phone, to name a few non-limiting possibilities.

In order to obtain the location of device 110, the LBS node 130 can send a location information request 132 to the core network 120C. The location information request 132 may be sent to the SUPL server 170 or to the GMLC 160. The location information request 132 can be sent using the MLP protocol, which is an OMA standard. Whether the LBS node 130 issues the location information request 132 to the SUPL server 170 or to the GMLC 160 depends on the service profile (use case) that the LBS node 130 node is providing. Regardless of the origin of the request for location information, the location information request 132 is processed by an entity 200 that implements a routing function/selection process. The entity 200 may be implemented as a stand-alone processor/server, or it may be integrated within one or both of the GMLC 160 and the SUPL server 170.

Figure 2:
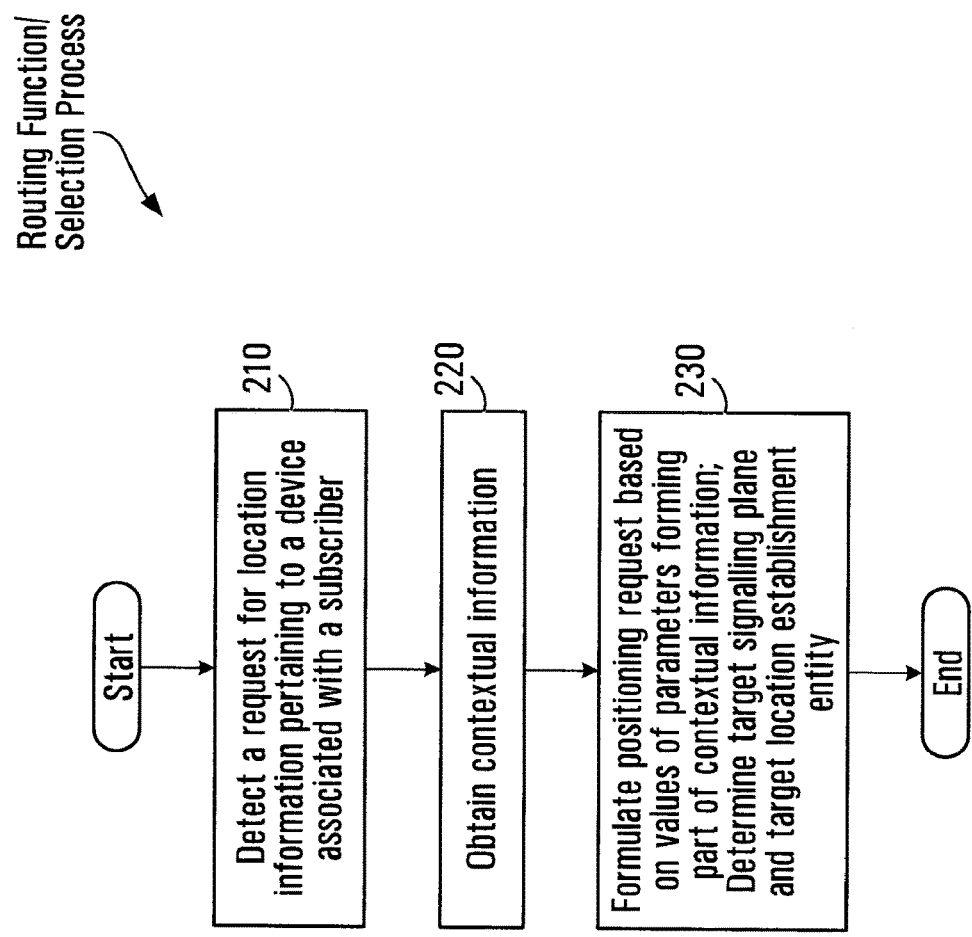
FIG. 2 is a flowchart illustrating execution of a routing function/selection process by an entity in the wireless communication environment of FIG. 1.

With additional reference to FIG. 2, there is shown a routing function/selection process that can be executed by the entity 200 in the core network 120C. In particular, the entity 200 may execute instructions stored on a computer-readable storage medium and which encode the routing function/selection process. The entity 200 can be integrated with the GMLC 160 or the SUPL server 170, or it may be separate from either the GMLC 160 or the SUPL server 170. In some embodiments, the entity 200 may comprise a web server that is reachable over the internet 172.

Step 210

The entity 200 receives a request for location information regarding a device associated with a particular subscriber (in this case, device 110). The request for location information can be the location information request 132 generated by the LBS application 130. Alternatively, in the absence of an explicit location information request from the LBS application 130, the request for location information can be received implicitly, such as when an internal timer or logic block determines that there is a need to obtain location information regarding device 110.

Step 220

The entity 200 obtains current contextual information regarding the request for location information, i.e., information characterizing a context surrounding receipt of the request for location information. Some of the contextual information can be included with the location information request 132, if such was indeed processed at step 210. For example, the location information request 132 can include contextual information such as accuracy parameters (e.g., a demand that the result be accurate to within, say, 5 km), timeout parameters (e.g., a demand that the result be obtained within 60 seconds), rebid parameters (e.g., the number of recurring locates to make or a retry attempt) as well as common administrative-type parameters needed for proper functioning of the protocol that carries the location information request 132.

Additional contextual information can also be obtained by the entity 200. A database 195 is illustrated as being a source of such additional contextual information, with the understanding that the additional contextual information can be sourced within other elements of the mobile network 120 or within other information system elements (databases, subscriber systems, business parameters) not illustrated. As such, step 220 can involve the entity 200 interacting with business critical systems shown or not shown in FIG. 1.

By way of non-limiting example, the contextual information can include a collection of values of various parameters that can be grouped according to the following categories:

parameters that characterize the requesting LBS application:

| parameter | example values |
|---|---|
| IP (Internet Protocol) address | Any IP address assigned to the operating LBS Application server. |
| MLP (Mobile Location Protocol) | OMA-TS-MLP-V3_3 |
| Trusted | Yes or No. |
| Can be based on the IP address of requesting Location Application as interconnected with Data Network 172 (or implied-trusted if connected within 120C) | |
| Mobile Network Operator Hosted | Yes or No. |
| Can be based on an IP address. If this is a Mobile Network hosted LBS Application Server then the IP address would assigned from within Mobile Network 120C. If the LBS Application server is a 3$^{rd}$ Party hosted system then the IP address would be so assigned. | |
| Untrusted → Opt-in notifications | "Do you wish to opt in?" |
| Opt-in notifications can be made mandatory for untrusted LBS Application servers. (This is a business rule attribute to assess and make notifications with a subscriber to obtain their Opt-in consent for the network to determine their location.) | |
| Accuracy degree of adherence requirements | The subscriber's location to be determined to within 500 meters) on a "Best Effort" basis. |
| Latency (timeout) and rebid requirements | The subscriber's location to be determined to within, e.g, 45 seconds | parameters that characterize the subscriber:

| parameter | example values |
|---|---|
| MSISDN (Mobile Station International Subscriber Directory Number) Without the leading country and network codes this is otherwise known to subscribers as their "phone number" which in North America is a 10 digit phone number starting with a 3 digit area code, thus 4163102355, in this example. | 3026404163102355 |
| IMSI International Mobile Subscriber Identity [23.003], [J-STD-036] | 302610011110001 |
| IMEI International Mobile station Equipment Identity | 35328500000999X or |

| parameter | example values |
|---|---|
| [23.003] or MEID (Mobile Equipment Identifier) | 00446688113355X X - Lunh check digit not shown |
| ICCID (Integrated Circuit Card Identifier) But for certain coordinated global header digits this number is arranged and managed by the procurer of the UICCs which is typically the host Mobile Network Operator. | 8930261020207775555 |
| Home and roamer networks | Yes or No, with qualifiers as established within a Subscriber's account profile of enrolled services |
| Access to voice services | Yes or No, with qualifiers as established within a Subscriber's account profile of enrolled services |
| Access to data services | Yes or No, with qualifiers as established within a Subscriber's account profile of enrolled services |
| Value-added services | Voice mail service SMS service LBS service Mobile browser 2 GB per month mobile data allocation | parameters that characterize the mobile network 120 (including various nodes in the radio access network 120R and the core network 120C):

| parameter | example values |
|---|---|
| Mobile Country Code & Mobile Network Code (header portions of IMSI) | MCC: 302 (Canada) MNC: 640 (Bell Mobility) |
| Susbscriber Identifier A limited resource pool of numbers managed by the Mobile Network Operator to assign to their Subscribers, for example: | 4163102355 |
| Ki key-pairs This is a 32 character (hexadecimal number) that is securely stored in the Mobile Network and within the UICC and is managed and handled as a write only (not readable) parameter within the system. A key-pair is formed by the systematic association fixed to a partner IMSI number. Additional key-pair integrity checks may be employed by a wireless communication environment. | A12C45B4CC33BB4532332BBCA12349AC |
| Node B (cell sites) status | CELL SITE #1 = exists and is online CELL SITE #2 = exists and is down |
| RNC/MSC/SGSN/GGSN (core) status | RNC = exists and is online MSC = exists and is online SGSN/GGSN = exists and is online |
| SMSC/HLR/VLR status | SMSC = exists and is online HLR = exists and is online VLR = exists and is online |
| OTA system status (provisioning) | OTA = exists and is online | parameters that characterize device 110:

| parameter | example values |
|---|---|
| MSISDN or (MDN in cdma) | 3026404163102355 |
| IMEI | 35328500000999X |
| | or |
| | 00446688113355X |
| | X - Lunh check digit not shown |
| | or (ESN in cdma) |
| IMSI International Mobile Subscriber Identity [23.003], [J-STD-036] | 302610011110001 |
| UE (User Equipment) classification (2G, 3G, or 4G) This context can become known through the IMEI (which contains device manufacturer, model, and software version number reference information within its syntax) or by way of other sources of information managed by the wireless operator, for example from data within the HLR and Subscriber provisioning & billing subsystems within 120. | UMTS-HSPA Release 7, Category 6 (thus a 3G device capable of voice and high speed packet data). |
| AGPS equipped support The affirmative or negative can be derived and previously established from UE classification context or indeed by attempts (successful or not) to engage in a SUPL session | YES or NO or Unknown. |
| BIP (Bearer Independent Protocol) support The affirmative or negative can be derived and previously established from UE classification context or indeed by attempts (successful or not) to engage in a SUPL session. | YES or No or Unknown. |
| CAT-TP ("Card Application Toolkit - Transport Protocol", per ETSI standards TS 102 124 and TS 102 127) support The affirmative or negative can be derived and previously established from UE classification context or indeed by attempts (successful or not) to engage in a SUPL session. | YES or No or Unknown. |
| Java JSR (Java Specification Request) 177 and JSR 179 support The affirmative or negative can be derived and previously established from UE classification context or indeed by attempts (successful or not) to engage in a SUPL session. | YES or No or Unknown. | parameters that characterize the device's SIM/UIC card 670 or 770:

| parameter | example values |
|---|---|
| ICCID But for certain coordinated global header digits this number is arranged and managed by the procurer of the UICCs which is typically the host Mobile Network Operator. | 8930261020207775555 |
| IMSI | 302610011110001 |
| Ki key-pairs This is a 32 character (hexadecimal number) that is securely stored in the Mobile Network and within the UICC and is managed and handled as a write only (not readable) parameter within the system. A key-pair is formed by the systematic association fixed to a partner IMSI number. Additional key-pair integrity checks may be employed by a wireless communication environment. | A12C45B4CC33BB4532332BBCA12349AC |
| AGPS-equipped This would depend on the native capabilities of the UICC in question, and for the case of this Application and the description of certain use case scenarios the UICC can have an embedded GPS sub-module. | Y/N YES or NO or Unknown |
| SIM toolkit support | Y/N YES or NO or Unknown |
| Applets (onboard) | SUPL Client applet - may work transparently to the device user's knowledge (thus no User Interaction); Special Numbers applet - a speed dial list of convenient phone numbers such as Directory Assistance or Client Care; Self Care applet - an embedded web link to conveniently launch mobile browser to Wireless Network Operator's services portal; Buddy Finder applet - a Location services feature that employs the SUPL Client and may interact with the user by presenting certain information or initiating a mobile browser session to display a map, for example; |
| Applets (provisionable) | PLMN List Manager applet - a special client that can be modified to add or remove identities of Roaming Networks so as to help and allow the device to properly find a compatible network to acquire when the Subscriber is away from their Home network; |
| Capabilities and configuration A collection of key and main characteristics of the Subscribers' UICC card, such as its memory capacity, protocol revision support, Applets on board or provisionable, as well as the provisioned state or status of the UICC card. | | parameters that characterize the subscription from a business/financial perspective:

| parameter | example values |
|---|---|
| MSISDN | 3026404163102355 |
| Account # An custom identification scheme - typically anchored in a Mobile Network operator's billing sub-system - to associate with a Subscriber. | a unique identifier |
| Subscription type This kind of attribute can take on several operational and organizational dimensions depending on the Mobile Network Operator's arrangement and can offer context about the subscribers pre-established service preferences or general status within 120, for example: Prepaid - allow voice & data service if in good standing A visiting roamer - allow services as governed by their host/home network Data only device | "A prepaid Subscriber with an account in good standing and English language as a preference for system generated messages" |
| General status | active, suspended, terminated, pre-activation |
| Language preference | English, French, Spanish |
| Other attributes, real-time or ad-hoc These are custom attributes and schemes and information - typically cross referenced to or anchored in a Mobile Network operator's services sub-systems - to associate with a Subscriber so as to render a timely and proper experience. Services may be hosted by distinct or same, hosted or 3$^{rd}$ party, trusted or untrusted Location Application servers and operators interconnected by 172. | "Subscribed to Location services: 1) City-Walk-And-Map-Guide 2) Here-I-Am-Instant-Coupons 3) Show-My-Family-On-A-Map 4) Emergency 911 with Location 5) Points-Of-Interest-Drive-By-Ads 6) Map-My-Friends-Near-Me 7) Where-Is-My-Missing-Phone" |

The contextual information obtained at step 220 may include values related to some or all of the parameters mentioned above. Also, the contextual information obtained at step 220 may include values of parameters other than those mentioned above. In some cases, the values of some parameters may be unknown at the time of obtaining the contextual information, in which case the values could be returned as "unknown" or they might simply not be provided.

Step 230

The entity 200 proceeds with the formulation of a positioning request destined for device 110. The purpose of the positioning request is to cause device 110 to retrieve location information from a "target" location establishment entity, which can be either a built-in location establishment entity (e.g., GPS sub-module 635) or a removable location establishment entity (e.g., GPS sub-module 735). In addition, it will be appreciated that the positioning request will be sent to device 110 over a "target" signaling plane, which can be either the above-described "control plane" or the above-described "user plane".

By executing step 230, of the routing function/selection process, the entity 200 solves the problem of selecting the "target" location establishment entity and the "target" signaling plane, by taking into consideration the values of the parameters included in the contextual information obtained at step 220. As such, there is a mapping between various possible sets of parameter values and the manner in which the positioning request is to be delivered to device 110. In fact, the number of possible sets of parameter values is large, and it should therefore be clear that many different sets of parameter values will map to the same choice of target location establishment entity and target signaling plane.

Figure 9:
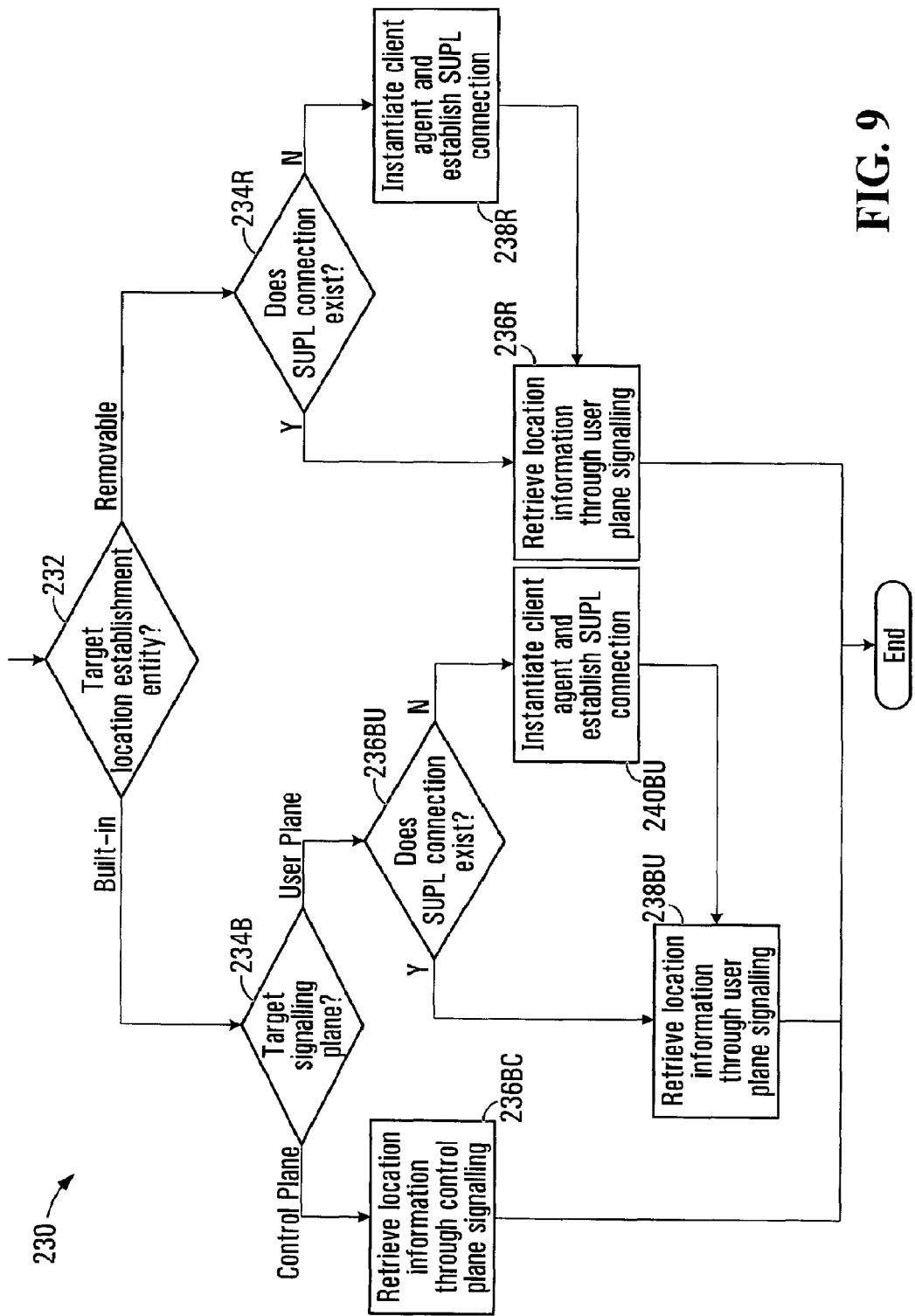
FIG. 9 is an expanded version of step 230 in FIG. 2.

With additional reference to FIG. 9, which illustrates step 230 in greater detail, it will be seen that step 230 is broken down into a first step 232, where the routing function/selection process determines whether the target location establishment entity is a built-in location establishment entity or a removable location establishment entity. Many different parameters may either individually, or cumulatively with other parameters, tip the balance in favor of one particular target location establishment entity (either built-in or removable).

By way of example, in cases where the device has a built-in location establishment entity and where the device has no removable location establishment entity (or where it is unknown whether the device has a removable location establishment entity), then the left branch out of step 232 could be taken, whereas in cases where the device has a removable location establishment entity and where the device has no built-in location establishment entity (or where it is unknown whether the device has a built-in location establishment entity), then the right branch out of step 232 could be taken.

By way of example, in cases where the device has both a removable location establishment entity and where the LBS application has a stringent latency expectation greater than a certain threshold (e.g., a return is required in less than 30 seconds), then despite the presence of the removable location establishment entity, it may be preferable to send a positioning request to a built-in location establishment entity.

Selection of the target location establishment entity could also depend on the behavior of device 110 in response to a previously sent positioning request. For example, if a positioning request was previously sent to a removable location establishment entity and device 110 did not respond within a certain time limit, then left branch of step 232 could be taken. Conversely, if a positioning request was previously sent to a built-in location establishment entity and device 110 did not respond within a certain time limit, then the right branch of step 232 could be taken.

Other rules and principles for selecting the target location establishment entity are provided later on.

Depending on the outcome of step 232, the routing function/selection process proceeds to either step 234R (in the case where the target location establishment entity is a removable location establishment entity) or 234B (in the case where the target location establishment entity is a built-in location establishment entity).

In the case where the target location establishment entity is a removable location establishment entity, the routing function/selection process determines by default that user plane signaling is to be used. To allow location information to be retrieved through the use of user plane signaling, a secure user plane (SUPL) connection is expected to have been established between a client agent instantiated by the processor 720 in the GPS-enabled SIM/UIC card 770 and a corresponding server agent instantiated by the SUPL server 170.

Accordingly, at step 234R, the routing function/selection process verifies whether a secure user plane (SUPL) connection already exists between a client agent instantiated by the processor 720 and a corresponding server agent instantiated on the SUPL server 170. For example, a secure user plane (SUPL) connection involving a client agent instantiated by the processor 720 may exist when the processor 720 is involved in an active data session.

Where a secure user plane (SUPL) connection exists, the routing function/selection process proceeds from step 234R to step 236R, where location information is retrieved through the use of user plane signaling. Step 236R is described further below.

Where no secure user plane (SUPL) connection exists (for example, in the case where there is no client agent instantiated on the device-side), the routing function/selection process proceeds from step 234R to step 238R, where steps are taken to instantiate a client agent, and to establish a secure user plane (SUPL) connection between such client agent and a server agent. Step 238R is described further below. Once the secure user plane connection (SUPL) has been established, the routing function/selection process proceeds to step 236R, where location information is retrieved through the use of user plane signaling.

It is now recalled that the another possible outcome of step 232 arises when the target location establishment entity is a built-in location establishment entity. In this case, the routing function/selection process proceeds to step 234B, where it is determined whether the target signaling plane is the control plane or the user plane. Many different parameters may either individually, or cumulatively with other parameters, tip the balance in favor of one particular target signaling plane (either control plane or user plane).

Depending on the outcome of step 234B, the routing function/selection process proceeds to either step 236BC (in the case where the target signaling plane is the control plane) or 236BU (in the case where the target signaling plane is the user plane). Step 236BC is described further below.

As far as step 236BU is concerned, the routing function/selection process verifies whether a secure user plane (SUPL) connection already exists between a client agent instantiated by the application processor 620 and a corresponding server agent instantiated on the SUPL server 170. For example, a secure user plane (SUPL) connection involving a client agent instantiated by the application processor 620 may exist when the application processor 620 is involved in an active data session.

Where a secure user plane (SUPL) connection exists, the routing function/selection process proceeds from step 236BU to step 238BU, where location information is retrieved through the use of user plane signaling. Step 238BU is described further below.

Where no secure user plane (SUPL) connection exists (for example, in the case where there is no client agent instantiated on the device-side), the routing function/selection process proceeds from step 236BU to step 240BU, where steps are taken to instantiate a client agent, and to establish a secure user plane (SUPL) connection between such client agent and a server agent. Step 240BU is described further below. Once the secure user plane connection (SUPL) has been established, the routing function/selection process proceeds to step 238BU, where location information is retrieved through the use of user plane signaling.

The effect of the various parameter values on the overall choice of target location establishment entity and target signaling plane (i.e., the path through the flowchart in FIG. 9) can be codified as a rule set and/or a mapping, which can be stored in the database 195 and consulted by the entity 200.

Certain parameters have a tendency to exert a stronger influence on the path taken through the flowchart in FIG. 9, as indicated by the following table, which is provided by way of example only and is not to be considered as limiting:

| | Path taken through flowchart in FIG. 9 | | |
|---|---|---|---|
| Parameters strongly influencing path through flowchart in FIG. 9 | 232→ 234B→ 236BC | 232→ 234B→ 236BU | 232→ 234R |
| E911 critical (default start for everyone. Optimized to be speedy and return highest accuracy under the circumstances) | ✓ | ✗ | ✗ |
| Turn-by-turn application used by home network subscriber (high performance, high accuracy, multi-shot) | ✗ | ✓ | ✗ |
| Visitor who has obtained temporary services (voice, data, LBS featured offerings), for example, City-Walk-And-Map-Guide. | ✗ | ✗ | ✓ |
| Casual (unscheduled) or single-shot locate request by hosted or $3^{rd}$-Party LBS application (low, medium, or high accuracy). Secondary parameters that may influence choice between column 2 and column 3 can include: User's equipment Accuracy expectations | ✗ | ✓ | ✓ |
| Mobile Operator offered Client-Care Services - Bell shop finder, repair my phone locations, etc. (low, medium, or high accuracy). Secondary parameters that may influence choice between column 1 and column 3 can include: Accuracy expectations Method of interaction (mobile browser vs. text message pop-up vs. complimentary agent phone call to subscriber) | ✓ | ✗ | ✓ |
| Partnership to Mobile Operator offering advanced services - Points-Of-Interest-Drive-By-Ads (low, medium, or high accuracy, and/or scheduled). Secondary parameters that may influence choice between column 1 and column 2 can include: Identity of LBS application Whether the event is scheduled or recurring event Revenue model implemented by the partnership (which may dictate level of service, performance, accuracy, revenue sharing, and other expectations) | ✓ | ✓ | ✗ |

A small number of limited but non-limiting examples of possible combinations of parameter values leading to different paths being taken through the flowchart in FIG. 9 are presented in individual rows in the table of FIG. 8.

It should be understood that the combinations of parameter values in the table of FIG. 8 are for illustrative purposes only. Embodiments may exist where these same combinations of parameter values would result in a different formulation of the positioning request from the one given in a particular row in the table of FIG. 8, while other embodiments may exist where a particular formulation of the positioning request given in a particular row in the table of FIG. 8 results from a different combination of parameter values.

The various request formulation procedures appearing in the far-right column of FIG. 8 as a result of execution of step 230 are now described in further detail.

Step 236R

Figure 5:
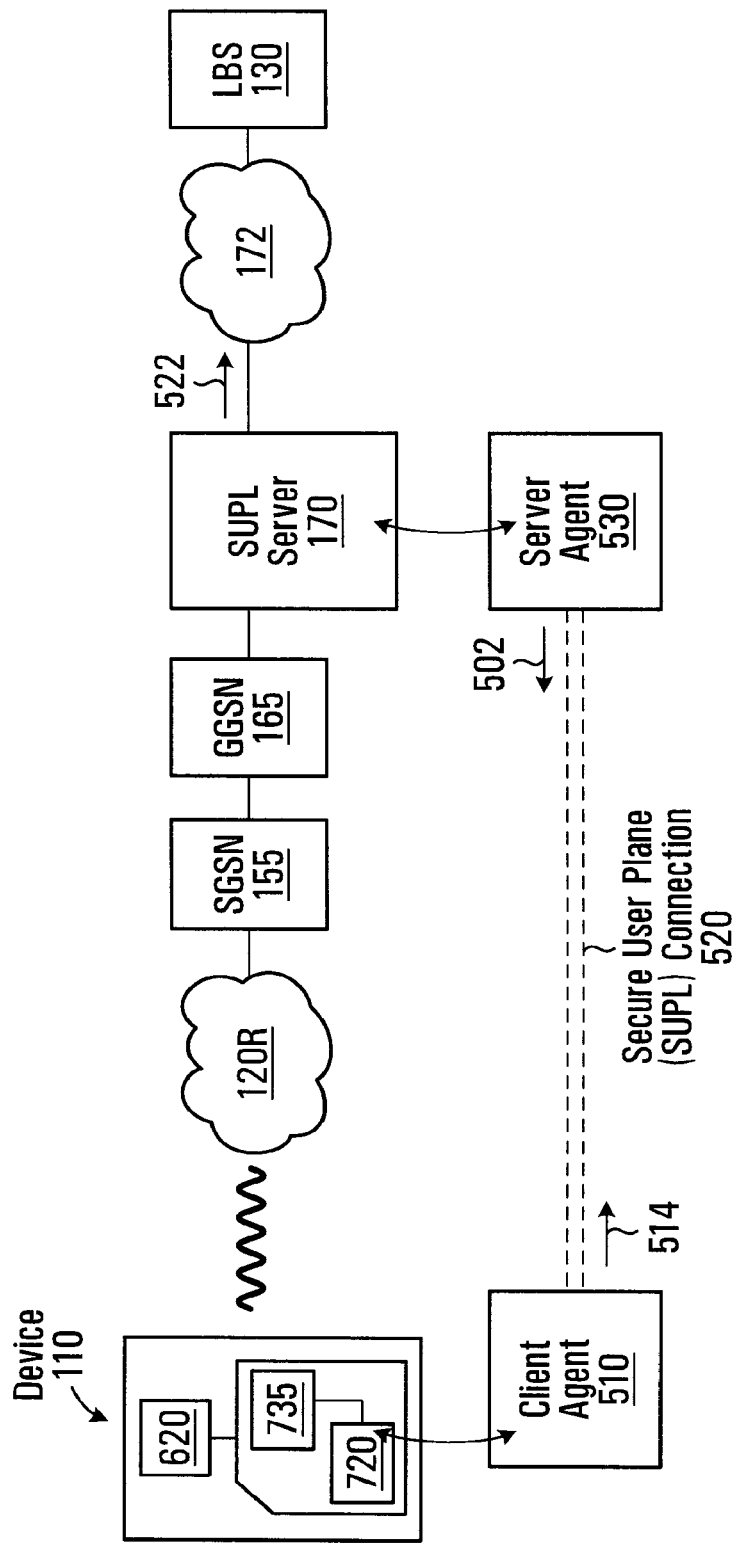

In order to retrieve location information regarding device 110, and with reference to FIG. 5, the entity 200 instructs the SUPL server 170 to request location information regarding device 110. In particular, the entity 200 identifies device 110 (e.g., by its IMSI or other identifier) and indicates that the location information is to be obtained by a (previously established) client agent instantiated by the processor 720 (associated with a removable location establishment entity). Accordingly, the SUPL server 170 identifies a client agent 510, a server agent 530 and a secure user plane (SUPL) connection 520 existing between client agent 510 and server agent 530.

Server agent 530 utilizes the GPS reference feed to determine information about specific satellites to be monitored. Server agent 530 can then send a message indicative of a positioning request 502 via secure user plane (SUPL) connection 520 to client agent 510. The processor 720 on the GPS-enabled SIM/UIC card 770 then retrieves location information from the removable location establishment entity (e.g., GPS sub-module 735).

The location information retrieved by client agent 510 may be in the form of GPS data, which can be included in a return message 514 sent to the server agent 530 using secure user plane (SUPL) connection 520. Server agent 530 at the SUPL server 170 may compute the device's location based on the GPS data in the return message 514. Specifically, server agent 530 may transform the GPS data (by various mathematical algorithms) into Geo-Location format relevant to users such as latitude/longitude and units of reference (coordinate system) as well as quality of information metrics (confidence level, accuracy, etc.) for the calculation. Server agent 530 can then send a return message 522 indicative of the device's location to the LBS node 130 for further processing.

Step 238R

To allow location information to be retrieved through the use of user plane signaling (as described above in connection with step 236R), secure user plane (SUPL) connection 520 is expected to have been established between client agent 510 instantiated by the processor 720 and corresponding server agent 530 instantiated on the SUPL server 170.

There are various ways to cause instantiation of client agent 510 and establishment of secure user plane (SUPL) connection 520 between client agent 510 and server agent 530. For example, in order to cause instantiation of a client agent by the processor 720, the SMSC 145 may issue a SUPL_INIT message destined for the GPS-enabled SIM/UIC card 770 but sent to device 110. One possibility is for the SUPL_INIT message to be sent to the MSC 135, while another possibility is for the SUPL_INIT message to be sent to the SGSN 155.

The SUPL_INIT message can be sent by the SMSC 145 as an SMS message, although the SUPL_INIT message may have a specific format due to the fact that it is destined for the processor 720 (and not the application processor 620). Indeed, depending on the format of a received SUPL_INIT message, the application processor 620 recognizes the message either as being destined for device 110 itself or for the GPS-enabled SIM/UIC card 770.

In the case here, the received SUPL_INIT message is destined for the GPS-enabled SIM/UIC card 770. Accordingly, the application processor 620 relays the received SUPL_INIT message to the GPS-enabled SIM/UIC card 770 using a protocol, such as such as BIP (Bearer Independent Protocol). The processor 720 then instantiates client agent 510, which establishes secure user plane connection 520 with server agent 530 at the SUPL server 170. Secure user plane connection 520 traverses device 110, the SGSN 155 and the GGSN 165.

Step 236BC

Figure 3:
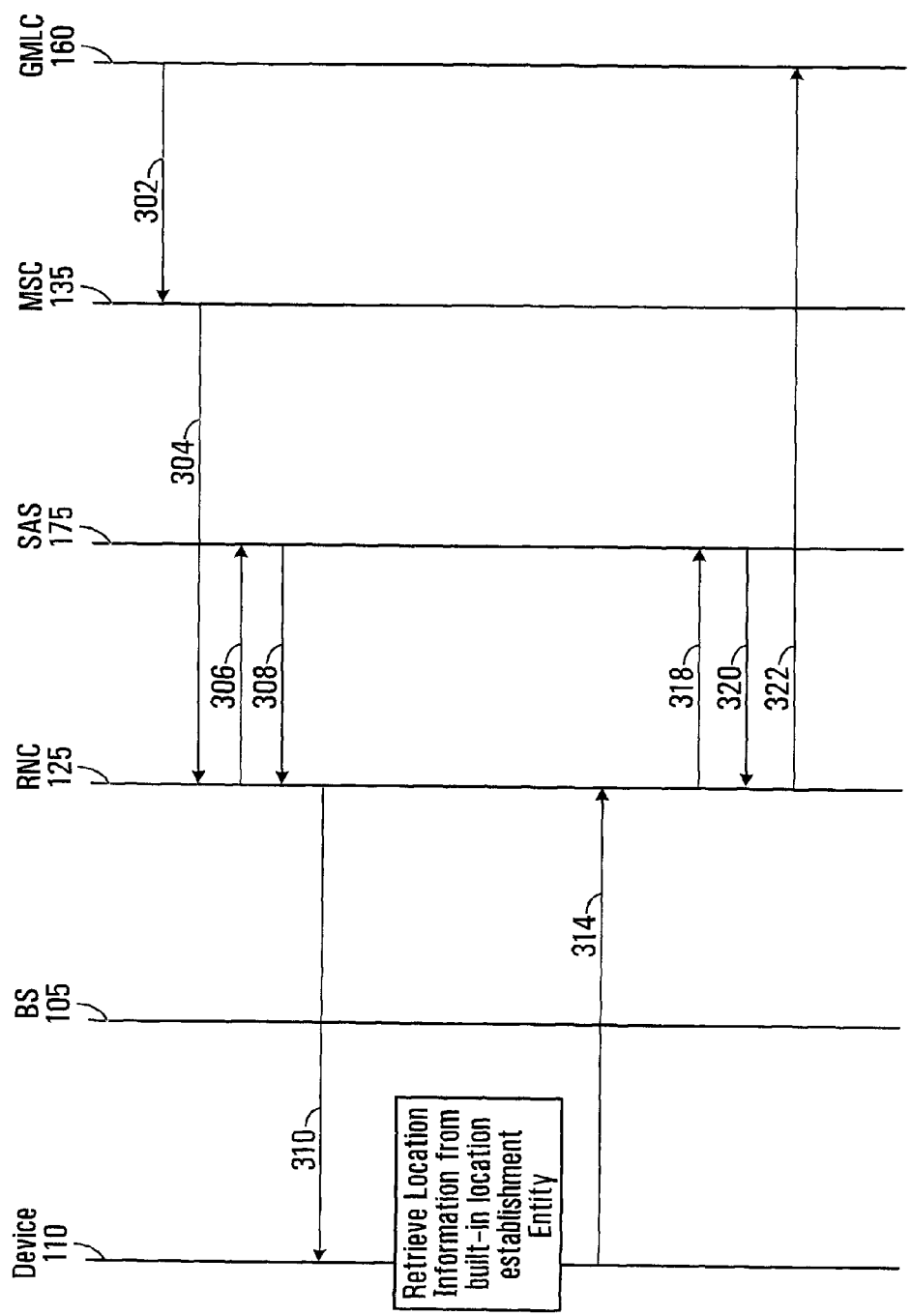
FIG. 3 is a message flow diagram illustrating control plane signaling to retrieve location information regarding a device in the wireless communication environment of FIG. 1, in accordance with a non-limiting embodiment of the present invention.

With reference to FIG. 3, the entity 200 instructs the GMLC 160 to send a message 302 indicative of a positioning request to the MSC 135. In accordance with a non-limiting example, message 302 can be a MAP/ANSI-41 message according to the 3GPP/3GPP2 protocol. The MSC 135 can then send a message 304 indicative of a positioning request to the radio network controller 125. In accordance with a non-limiting example, message 304 can be a Positioning Request message according to the 3GPP TS.24.030 (Location Services) protocol. The radio network controller 125 can then send a query 306 (e.g., a Location Request containing device addressing information, such as the IMSI) to the SAS 175. The SAS 175 provides assistance data (e.g., information about specific satellites to be monitored) in the form of a message 308 (e.g., a Location Response) sent back to the radio network controller 125. The radio network controller 125 can then send a message 310 indicative of a positioning request through the base station 105, towards device 110. In accordance with a non-limiting example, message 310 can be a Location Request message according to the 3GPP TS.24.030 (Location Services) protocol. The base station 105 can then relay message 310 to device 110, where it is processed by the application processor 620.

The application processor 620 on device 110 can then retrieve location information from the built-in location establishment entity (such as GPS sub-module 635A). The location information retrieved in this manner may be in the form of GPS data, which can be included in a return message 314 that can be sent by device 110 to the base station 105. In accordance with a non-limiting example, message 314 can be a Location Response message according to the 3GPP TS.24.030 (Location Services) protocol. The base station 105 can then relay the return message 314 indicative of the GPS data to the radio network controller 125. The radio network controller 125 can then send a response 318 indicative of the GPS data to the SAS 175. The SAS 175 may compute the device's location based on the GPS data in the response 318. Specifically, the SAS 175 may transform the GPS data (by various mathematical algorithms) into Geo-Location format relevant to users such as latitude/longitude and units of reference (coordinate system) as well as quality of information metrics (confidence level, accuracy, etc.) for the calculation. The SAS 175 can include the device's location in a response 320 sent back to the radio network controller 125. The radio network controller 125 can then send a return message 322 indicative of the device's location to the MSC 135. In accordance with a non-limiting example, message 322 can be a Location Information message according to the 3GPP TS.24.030 (Location Services) protocol. The MSC 135 can then relay message 322 indicative of the device's location to the GMLC 160.

The GMLC 160 can then return the device's location to the LBS node 130 for further processing. The device's location may be formulated in a message according to the MLP protocol, which may have been used for transmitting the initial request from the LBS node 130.

Step 238BU

Figure 4:
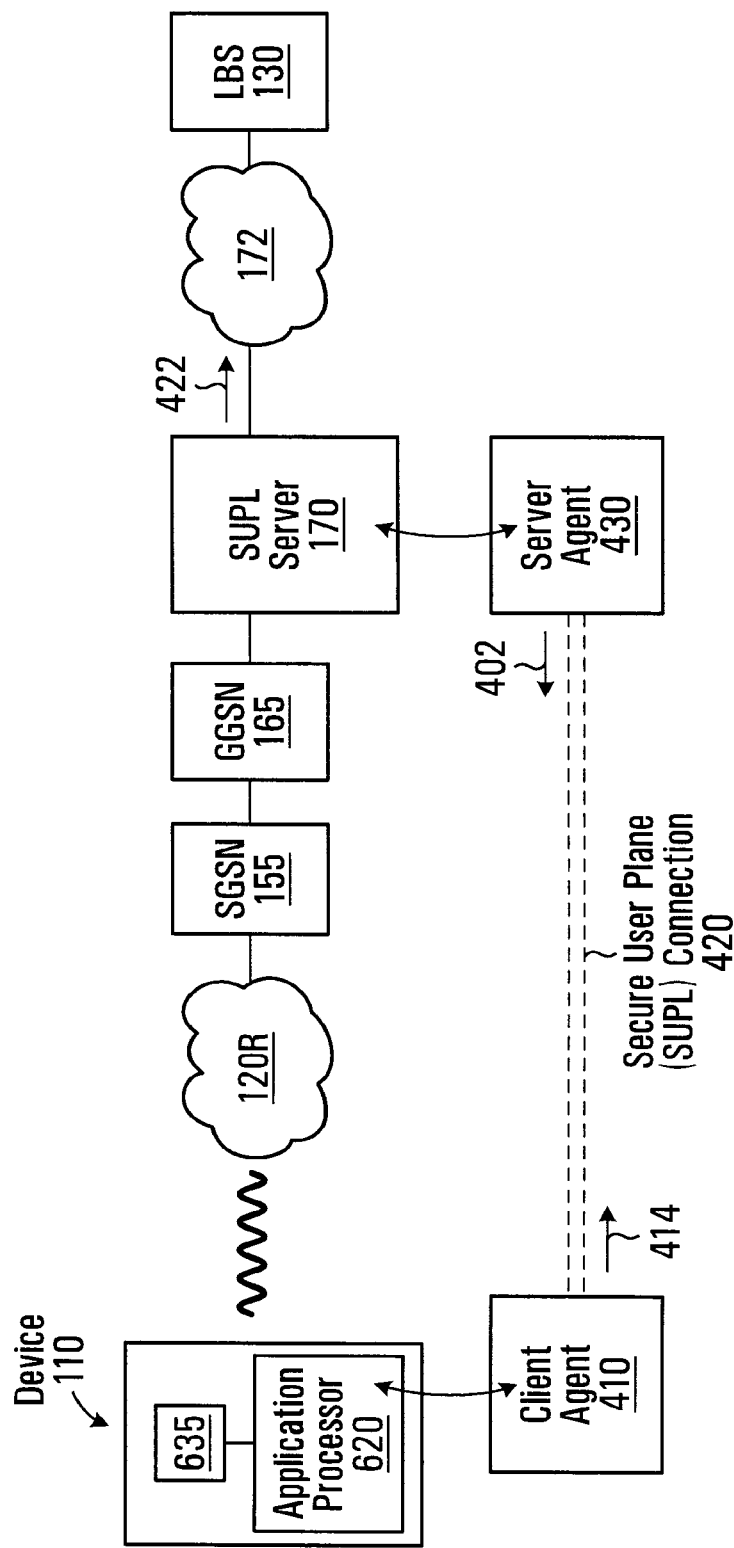
FIGS. 4 and 5 are block diagrams, each with an exchange of messages amongst different entities in the wireless communication environment of FIG. 1, illustrating user plane signaling to retrieve information regarding the device, in accordance with two non-limiting embodiments of the present invention.

In order to retrieve location information regarding device 110, and with reference to FIG. 4, the entity 200 instructs the SUPL server 170 to request location information regarding device 110. In particular, the entity 200 identifies device 110 (e.g., by its IMSI or other identifier) and indicates that the location information is to be obtained by a (previously established) client agent instantiated by the application processor 620 (associated with a built-in location establishment entity). Accordingly, the SUPL server 170 identifies a client agent 410, a server agent 430 and a secure user plane (SUPL) connection 420 existing between client agent 410 and server agent 430.

Server agent 430 utilizes the GPS reference feed to determine information about specific satellites to be monitored. Server agent 430 can then send a message indicative of a positioning request 402 via secure user plane (SUPL) connection 420 to client agent 410. The application processor 620 built into device 110 then retrieves location information from the built-in location establishment entity (e.g., GPS sub-module 635).

The location information retrieved by client agent 410 may be in the form of GPS data, which can be included in a return message 414 sent to the server agent 430 using secure user plane (SUPL) connection 420. Server agent 430 at the SUPL server 170 may compute the device's location based on the GPS data in the return message 414. Specifically, server agent 430 may transform the GPS data (by various mathematical algorithms) into Geo-Location format relevant to users such as latitude/longitude and units of reference (coordinate system) as well as quality of information metrics (confidence level, accuracy, etc.) for the calculation. Server agent 430 can then send a return message 422 indicative of the device's location to the LBS node 130 for further processing.

Step 240BU

To allow location information to be retrieved through the use of user plane signaling (as described above in connection with step 236R), secure user plane (SUPL) connection 420 is expected to have been established between client agent 410 instantiated by the application processor 620 and corresponding server agent 430 instantiated on the SUPL server 170.

There are various ways to cause instantiation of client agent 410 and establishment of secure user plane (SUPL) connection 420 between client agent 410 and server agent 430. For example, in order to cause instantiation of a client agent by the application processor 620, the SMSC 145 may issue a SUPL_INIT message destined for device 110. One possibility is for the SUPL_INIT message to be sent via the MSC 135, while another possibility is for the SUPL_INIT message to be sent via the SGSN 155.

The SUPL_INIT message can be sent by the SMSC 145 as an SMS message, although the SUPL_INIT message may have a specific format due to the fact that it is destined for the application processor 620 (and not the processor 720). Indeed, depending on the format of a received SUPL_INIT message, the application processor 620 recognizes the message either as being destined for device 110 itself or for the GPS-enabled SIM/UIC card 770.

In the case here, the received SUPL_INIT message is destined for device 110 itself. Accordingly, the application processor 620 instantiates a client agent 410, which then establishes a secure user plane connection 420 with a server agent 430 at the SUPL server 170. The secure user plane connection 420 traverses the SGSN 155 and the GGSN 165.

It will be appreciated that the built-in and removable aspects of the above described location establishment entities are simply examples, and that in lieu being built-in or removable, the location establishment entities may be referred to as internal and external, primary and secondary, main and alternate, first and second, second and first, etc.

Also, although certain embodiments have contemplated that under some circumstances device 110 could be equipped with two distinct location establishment entities, it is envisaged that under some circumstances device 110 could be equipped with more than two distinct location establishment entities.

Also, although the global positioning system (GPS) was mentioned as a location establishment technology, this is not a requirement, as other technologies could be used. For example, it is conceivable that WIFI ad hoc network positioning could be employed, which involves sensing, measurement, SSID & MAC address lookup, and mapping. Also, it should be appreciated that embodiments may exist in which the location establishment entities are not capable of determining a location to a greater degree of accuracy that a cell site/sector. Under such circumstances, the location establishment entities would not be referred to as GPS sub-modules.

Also, although in the above scenarios, the request for location information was received from an LBS node 130 connected to the core network and running an LBS application, it should be appreciated that the request for location information may originate from an LBS application running on another device communicating via the radio access network 120R. In other cases, no such request for location information is sent or received by the LBS node 130; rather, it a request for location information is generated internally to the entity 200, resulting in the location information being obtained autonomously (e.g., based on a predefined time limit having been reached, such as an amount of time having elapsed since the location of device 110 was last determined or a specified time of day having been reached).

Also, it is envisaged that the present invention may be applicable to CDMA-based 3G/4G mobile networks where the mobile terminal devices are equipped with or employ RUIM (removable user identity module) based subscriber smart cards.

Certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

What is claimed is:

1. A method for execution by at least one entity in a wireless communication environment, the method comprising:

receiving a request for location information pertaining to a subscriber device;

obtaining contextual information regarding the request for location information;

formulating a positioning request for transmission to the device over a communication network, wherein depending on the contextual information, the positioning request is formulated to instruct the device to retrieve location information from a built-in location establishment entity or from a removable location establishment entity at the device, determining, based on the contextual information, a target signaling plane over which to send the positioning request message to the device, the target signaling plane selected from one of a control plane or a user plane on the communication network wherein the control plane is used in the establishment and monitoring of a connection in the user plane, the target signaling plane selected at least in part based on a type of location establishment entity from which the device is instructed to retrieve the location information from, and sending the positioning request to the device over the target signaling plane.

2. The method defined in claim 1, wherein the positioning request is formulated to instruct the device to retrieve location information from the built-in establishment entity when the contextual information indicates (i) that the device includes the built-in location establishment entity and (ii) that the device does not include the removable location establishment entity or that it is unknown whether the device includes the removable location establishment entity.

3. The method defined in claim 1, wherein the request for location information is issued by a node executing a location-based service (LBS) application, and wherein the positioning request is formulated to instruct the device to retrieve location information from the built-in location establishment entity when the contextual information indicates (i) that the device includes the removable location establishment entity and (ii) that the LBS application has a stringent latency expectation greater than a threshold.

4. The method defined in claim 1, wherein the positioning request is formulated to instruct the device to retrieve location information from the removable location establishment entity when the contextual information indicates (i) that the device includes the removable location establishment entity; and (ii) that the device is compliant with the Bearer Independent Protocol (BIP) protocol.

5. The method defined in claim 1, wherein the request for location information is received from a source external to the at least one entity, wherein the source of the request for location information is a node executing a location based services (LBS) application and wherein the request for location information is received over the Internet.

6. The method defined in claim 1, wherein the target signaling plane is selected to be the user plane when the contextual information indicates that the device includes the removable location establishment entity and does not include the built-in location establishment entity.

7. The method defined in claim 1, wherein when (i) the positioning request is formulated to instruct the device to retrieve location information from the built-in location establishment entity and (ii) the target signaling plane is selected to be the user plane: the positioning request is sent over a secure user plane connection established with a client agent instantiated by a processing entity that is built into the device.

8. The method defined in claim 1, wherein when (i) the positioning request is formulated to instruct the device to retrieve location information from the removable location establishment entity and (ii) the target signaling plane is selected to be the user plane: the positioning request is sent over a secure user plane connection established with a client agent instantiated by a processing entity that is removable with respect to the device.

9. The method defined in claim 1, wherein the contextual information includes information about whether the device responded to a previous positioning request, wherein the positioning request is formulated to retrieve location information from the built-in location establishment entity when the device did not respond to the previous positioning request within a certain time limit and the previous positioning request was sent to the removable location establishment entity.

10. The method defined in claim 1, wherein the target signaling plane is selected to be the user plane and wherein the positioning request is formulated to instruct the device to retrieve location information from the built in location establishment entity when the contextual information indicates that an emergency call has been placed by the device.

11. The method defined in claim 1, wherein the request for location information is issued by a node executing a location-based service (LBS) application, wherein the target signaling plane is selected to be the user plane and wherein the positioning request is formulated to instruct the device to retrieve location information from the built-in location establishment entity when the contextual information indicates that (i) the LBS application is a turn-by-turn application and (ii) the device is associated with a subscriber of the communication network.

12. The method defined in claim 1, wherein the positioning request is formulated to instruct the device to retrieve location information from the removable location establishment entity when the contextual information indicates that the device is not registered with any subscriber of the communication network.

13. The method defined in claim 1, wherein the target signaling plane is selected to be the user plane and wherein the positioning request is formulated to instruct the device to retrieve location information from the built-in location establishment entity when the contextual information indicates that the request for location information is an unscheduled or single-shot request.

14. The method defined in claim 1, wherein the request for location information is issued by a node executing a location-based service (LBS) application, wherein the target signaling plane is selected to be the user plane and wherein the positioning request is formulated to instruct the device to retrieve location information from the built-in location establishment entity when the contextual information indicates that the LBS application is operated by an entity in partnership with an operator of the communication network.

15. An entity in a wireless communication environment, comprising:

a processing entity for:
  receiving a request for location information pertaining to a subscriber device;
  obtaining contextual information regarding the request for location information;
  formulating a positioning request for transmission to the device over a communication network, wherein depending on the contextual information, the positioning request is formulated to instruct the device to retrieve location information from a built-in location establishment entity or from a removable location establishment entity at the device;
  determining, based on the contextual information, a target signaling plane over which to send the positioning request message to the device, the target signaling plane selected from one of a control plane or a user plane on the communication network wherein the control plane is used in the establishment and monitoring of a connection in the user plane, the target signaling plane selected at least in part based on a type of location establishment entity from which the device is instructed to retrieve the location information from; and an output for releasing the positioning request towards the device.

16. A method for execution by at least one entity in a wireless communication environment, the method comprising:

receiving a request for location information pertaining to a subscriber device;

determining that the subscriber device is equipped with both a built-in location establishment entity and a removable location establishment entity;

consulting an information database to select a location establishment entity from the built-in location establishment entity and the removable location establishment entity;

determining, based on a contextual information associated with the request, a target signaling plane over which to send a location information message to the device, the target signaling plane selected from one of a control plane or a user plane on a communication network within the wireless communication environment wherein the control plane is used in the establishment and monitoring of a connection in the user plane, the target signaling plane selected at least in part based on a type of the selected location establishment entity; and sending the location information message to the device over the target signaling plane to retrieve location information from the selected location establishment entity.

* * * * *